Aug. 13, 1968  A. PITNER  3,397,332
JOURNAL ROLLING BEARING INCLUDING A SEGMENTED CAGE
Filed June 1, 1966
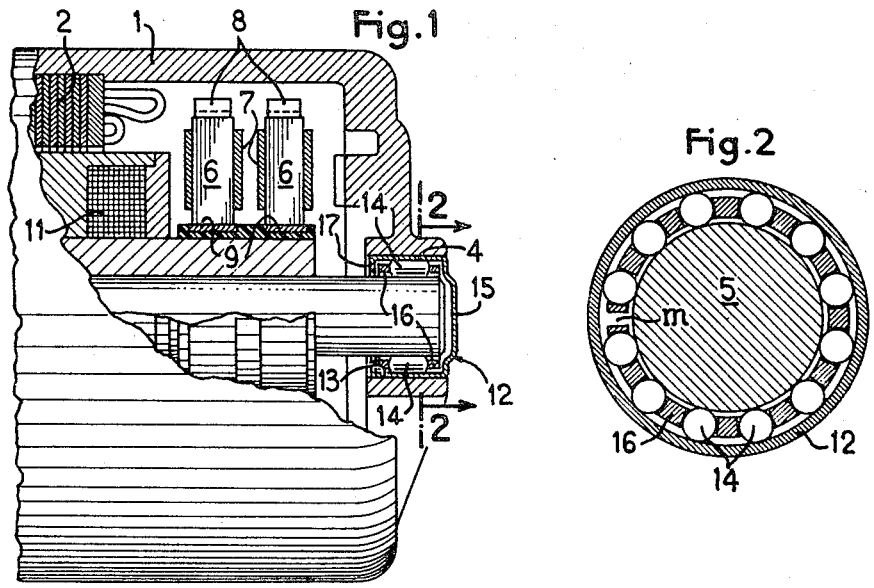
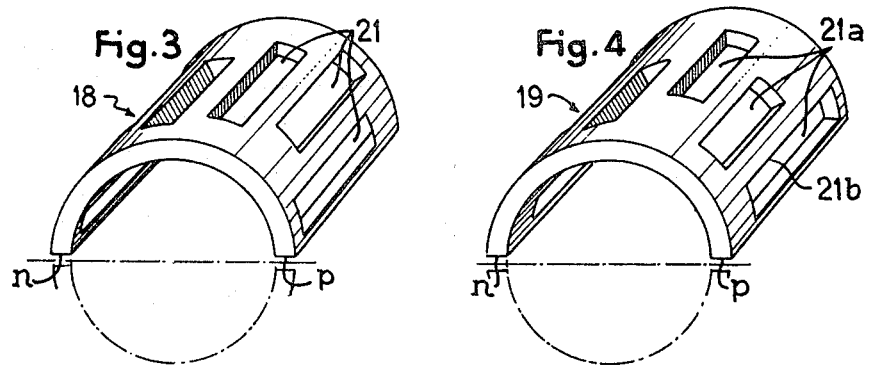
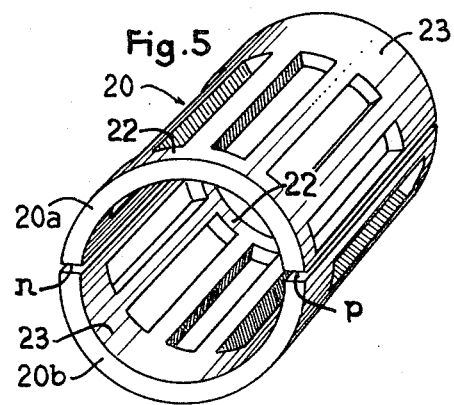

United States Patent Office 3,397,332
Patented Aug. 13, 1968

3,397,332
JOURNAL ROLLING BEARING INCLUDING A SEGMENTED CAGE
Alfred Pitner, Paris, France, assignor to Nadella S.A., Rueil-Malmaison, Seine-et-Oise, France, a French body corporate
Filed June 1, 1966, Ser. No. 554,558
Claims priority, application France, July 1, 1965, 23,047
8 Claims. (Cl. 310—90)

ABSTRACT OF THE DISCLOSURE

In an electric machine having a housing and a rotating part, the provision of a rolling bearing between the rotating part and the housing, this bearing having a rolling member-retaining segmented cage having an axial gap the relative circumferential dimensions of the inner raceway and cage being such that the gap is maintained irrespective of the radial position and shape of the cage in the bearing.

---

The present invention relates to radial or journal bearings having needles or rollers and a segmented cage, the relative circumferential dimensions of the inner race and the segmented cage being such that the latter has at least one axially extending gap irrespective of its radial position in roller operation.

This arrangement creates a permanent discontinuity in the development of the cage which is a marked advantage in the use of the rolling bearing according to the invention in an electric machine rotating with electromagnetic induction.

Indeed, when there is employed in such machines a needle or roller bearing whose cage is closed on itself, namely a continuous cage, there sometimes occurs under the effect of parasitic magnetic phenomena an axial attraction on the coil constituted by the cage. This attraction creates relatively energetic contacts between the faces of the marginal portions of the cage which interconnect the bars defining the needle-retaining apertures and the faces of the edges of the rolling bearing, and these contacts result in not only rubbing and heating but wear which could be such as to detach the most highly stressed edge, in particular when the latter is an attached member or forms part of a rolling bearing constituted by a thin ring obtained from sheet metal by a blanking and drawing operation.

This drawback is minimized or avoided when the bearings of the electric machine are provided with a rolling bearing according to the invention.

This advantage is added to the advantages of known segmented cages, namely:

Facility and cheapness of manufacture when the segment or segments are obtained by bending a strip previously cut out in the flat position according to the teaching of the French Patent No. 1,303,538, filed on July 31, 1961.

Possibility of mounting the segments inside a ring provided with radially extending portions for retaining in the axial direction.

Protection of the cage of the bearing against parasitic attraction phenomena can be improved by arranging the cage in a dissymmetrical manner, for example by offsetting the needles in the same segment by employing needles of different lengths, or by alternating the direction of the successive segments each of which is arranged dissymmetrically.

It will be understood that the segments can be constructed in such manner that they do not come in contact with the outer race irrespective of the radial position of the segments, as mentioned in said French patent.

Further features and advantages of the invention will be apparent from the ensuing description, with reference to the accompanying drawing to which the invention is in no way limited.

In the drawing:

FIG. 1 is a diagrammatic axial sectional view of an alternator comprising a rolling bearing according to the invention;

FIG. 2 is a sectional view taken along line 2—2 of FIG. 1, and

FIGS. 3–5 are perspective views of variants of cage segments.

The alternator shown in FIG. 1 is of a conventional type comprising inside a housing 1 a fixed armature 2 and a movable inductor 3 mounted on the shaft 5 which is journalled in a bearing 4 of the housing. Brushes 6 are guided at 7 and biased by a spring 8 and supply direct current to the windings 11 of the inductor through rings 9.

The bearing 4 is provided with a needle bearing consisting of a ring 12 which is fitted in a bore 13 and contains a series of needles 14 retained in the apertures of a cage 16 which is axially retained by the end wall 15 of the ring 12 and by a radial flange or shoulder 1' formed at the end of the ring 12 opposed to the wall 15.

According to the invention and as can be seen in FIG. 2, the cage 16 consists of a single segment whose end portions are, for all positions of operation of the rolling bearing, in a unconnected condition so that they form a permanent axially extending gap $m$ which creates a break in the circumferential development of the cage even when the latter is contracted to the maximum extent possible in contact with the shaft 5.

The cages 18, 19, 20 shown in FIGS. 3–5 differ from the cage 16 shown in FIGS. 1 and 2 in that they are constituted by two segments forming at their adjacent end portions two axial joints $n$ and $p$ at least one of which is permanently open and in that the arrangement of the apertures 21 receiving the needles renders the cage dissymmetrical. This dissymmetrical arrangement is achieved in FIG. 3 by an axially offset disposition of the apertures 21, in FIG. 4 by the offsetting of the apertures 21 and the difference in the axial lengths of the aperture 21a and apertures 21b, and in FIG. 5 by a reversed arrangement of the segments 20a, 20b which are identical but have marginal portions 22, 23 of different axial extents.

Although specific embodiments of the invention have been described, many modifications and changes may be made therein without departing from the scope of the invention as defined in the appended claims.

Having now described my invention what I claim as new and desire to secure by Letters Patent is:

1. An electric machine having a housing and a rotating part routed by electromagnetic induction, a journal rolling bearing interposed between said housing and said rotating part, said bearing comprising an inner raceway, an outer raceway, a segmented cage having apertures and end portions defining at least one gap which extends in a direction substantially parallel to the axis of said bearing said cage being located between said raceways, and rolling members disposed in and retained by said apertures and located between said raceways, the relative circumferential dimensions of said inner raceway and said cage being such that said gap is maintained irrespective of the radial position and shape of said cage in bearing operation, said gap being located between two adjacent rolling members, the apertures in which said two rolling members are disposed having portions retaining said two olling members in circumferentially spaced relation to each other so as to avoid electrically interconnecting said end portions of said cage.

2. A rolling bearing as claimed in claim 1, wherein the cage consists of a single segment.

3. A rolling bearing as claimed in claim 1, wherein the cage consists of a plurality of cage segments.

4. A rolling bearing as claimed in claim 1, wherein the disposition of said apertures in said cage is dissymmetrical.

5. A rolling bearing as claimed in claim 4, wherein said cage consists of a plurality of cage segments and at least some of the apertures of the same segment are in axially staggered relation to each other.

6. A rolling bearing as claimed in claim 4, wherein said cage consists of a plurality of cage segments and said apertures of the same segment have unequal lengths.

7. A rolling bearing as claimed in claim 4, wherein said cage comprises a plurality of cage segments and each segment has two peripheral marginal portions defining the ends of said apertures, said two marginal portions of each segment having different axial extents and peripherally adjacent segments having reversed dispositions relative to said rings.

8. An electric machine comprising a housing, a rotating part, electromagnetic induction means rotating said rotating part, and a journal rolling bearing interposed between said housing and said rotating part rotatably supporting said rotating part, said bearing comprising an inner raceway, an outer raceway, a segmented cage having apertures and end portions defining at least one gap which extends in a direction substantially parallel to the axis of said bearing, said cage being located between said raceways, and rolling members disposed in and retained by said apertures and located between said raceways, the relative circumferential dimensions of said inner raceway and said cage being such that said gap is maintained irrespective of the radial position of said cage in bearing operation, said gap being located between two adjacent rolling members, the apertures in which said two rolling members are disposed having portions retaining said two rolling members in circumferentially spaced relation to each other so as to avoid electrically interconnecting said end portions of said cage.

References Cited

UNITED STATES PATENTS

| | | | |
|---|---|---|---|
| 604,572 | 5/1898 | Tellefsen | 308—217 |
| 1,404,306 | 1/1922 | Levin | 310—90 |
| 2,503,070 | 4/1950 | Reiss | 308—217 |
| 2,972,688 | 2/1961 | Mahlfeldt | 310—90 |
| 3,046,064 | 7/1962 | Schaeffler | 308—217 |

MARTIN P. SCHWADRON, *Primary Examiner.*

FRANK SUSKO, *Assistant Examiner.*

UNITED STATES PATENT OFFICE
CERTIFICATE OF CORRECTION

Patent No. 3,397,332　　　　　　Dated August 13, 1968

Inventor(s) Alfred Pitner

It is certified that error appears in the above-identified patent and that said Letters Patent are hereby corrected as shown below:

In the heading, column 1, line 4, --of one-half interest-- should be inserted after "assignor".

SIGNED AND
SEALED

OCT 27 1970

(SEAL)
Attest:

Edward M. Fletcher, Jr.
Attesting Officer

WILLIAM E. SCHUYLER, JR.
Commissioner of Patents